(12) United States Patent
Lee

(10) Patent No.: US 9,529,900 B2
(45) Date of Patent: Dec. 27, 2016

(54) VISUAL INTERFACE BROWSER

(75) Inventor: Brian Lee, Plainfield, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 485 days.

(21) Appl. No.: 13/311,870

(22) Filed: Dec. 6, 2011

(65) Prior Publication Data

US 2013/0145262 A1    Jun. 6, 2013

(51) Int. Cl.
 *G06F 17/30* (2006.01)

(52) U.S. Cl.
 CPC .............. *G06F 17/30716* (2013.01)

(58) Field of Classification Search
 CPC ............... G06Q 10/103; G06F 17/243; G06F 17/30011; G06F 17/30873; G06F 17/30716
 USPC ........... 715/277, 705, 708, 712, 775
 See application file for complete search history.

(56) References Cited

U.S. PATENT DOCUMENTS

| | | | |
|---|---|---|---|
| 5,555,354 A * | 9/1996 | Strasnick | G06T 17/05 345/427 |
| 5,717,940 A * | 2/1998 | Peairs | 715/209 |
| 5,905,991 A * | 5/1999 | Reynolds | 715/234 |
| 5,970,066 A | 10/1999 | Lowry et al. | |
| 6,237,011 B1 * | 5/2001 | Ferguson et al. | 715/234 |
| 6,243,724 B1 * | 6/2001 | Mander et al. | 715/273 |
| 7,467,356 B2 | 12/2008 | Gettman et al. | |
| 7,877,460 B1 * | 1/2011 | Brouwer et al. | 709/217 |
| 2002/0059337 A1 * | 5/2002 | Takaoka | G06Q 10/10 715/255 |
| 2005/0246331 A1 * | 11/2005 | De Vorchik et al. | 707/3 |
| 2006/0069986 A1 * | 3/2006 | Sandoval | 715/517 |
| 2006/0106847 A1 * | 5/2006 | Eckardt et al. | 707/101 |
| 2007/0198952 A1 * | 8/2007 | Pittenger | 715/853 |
| 2011/0167492 A1 | 7/2011 | Ghosh et al. | |
| 2011/0185286 A1 | 7/2011 | Moyers et al. | |

* cited by examiner

Primary Examiner — Wilson Tsui

(74) Attorney, Agent, or Firm — Chiesa Shahinian & Giantomasi PC

(57) ABSTRACT

The present disclosure describes viewing visual interface documents through a visual interface browser. A visual interface browser is caused to be displayed on a user device. A visual interface document representing a technical interface specification is retrieved from a repository in response to user selection of a technical interface icon through the visual interface browser. Sub-document technical data associated with the visual interface document is retrieved from the repository. The visual interface document including sub-document technical data is caused to be displayed on the user device. Notes associated with the visual interface document and associated with an authenticated user of the user device are caused to be displayed on the user device.

3 Claims, 8 Drawing Sheets

VISUAL INTERFACE BROWSER

FIELD

The present application relates to a visual interface browser.

BACKGROUND

Typical technical interface specifications (documents including details for software developers) include service level agreement (SLA) information, contact information, configuration information, as well as images or diagrams that provide a visual reference to assist with understanding. However, even standardized technical interface specification layouts can impede efforts to quickly reference and quickly visualize technical specifications and solutions described by the document due to an overwhelming amount of information.

Technical interface specifications also present learning curves for individuals that need to reference the specifications for educational purposes relating to a producer/consumer environment and for those who need to apply information from the technical interface specifications within a proper context. In order to overcome these issues, technical interface specifications may include multiple images and figures. However, this is still only a marginal improvement, and does not facilitate efficient viewing of technical interface specifications.

SUMMARY

In accordance with an embodiment, the present disclosure describes facilitating the viewing of documents through a visual interface browser. A visual interface browser is caused to be displayed on a user device. A visual interface document representing a technical interface specification is retrieved from a repository in response to user selection of a technical interface icon through the visual interface browser. Sub-document technical data associated with the visual interface document is retrieved from the repository. The visual interface document including sub-document technical data is caused to be displayed on the user device. Notes associated with the visual interface document and associated with an authenticated user of the user device are caused to be displayed on the user device.

In an embodiment, a plurality of technical interface specifications are received. Each of the technical interface specifications is formatted to link the technical interface specifications with a corresponding technical interface icon. Each of the technical interface specifications is indexed to generate a plurality of visual interface documents accessible through the visual interface browser. Indexing each of the technical interface specifications comprises generating a categorized visualization of each technical interface specification for viewing as a visual interface document accessible through the visual interface browser.

In an embodiment, each visual interface document and associated sub-document technical data are linked within the repository.

In an embodiment, log-in credentials are received from a user of the user device. The user is authenticated based on the log-in credentials. Notes associated with the user are retrieved. The notes associated with the visual interface document are external to the visual interface document and associated sub-document technical data.

These and other advantages of this disclosure will be apparent to those of ordinary skill in the art by reference to the following detailed description and the accompanying drawings.

DETAILED DESCRIPTION

The method and system described herein addresses the technical interface specification viewing problem discussed above.

The visual interface browser described herein facilitates retrieval, viewing, sorting and referencing of technical interface specifications using visual interface documents (VIDs). VIDs incorporate visualization and contextual assignment of related data to each VID through the retrieval of associated sub-document technical data. The sub-document technical data may include, for example, service level agreement (SLA) information, contact information, and configuration information. VIDs also contain a logical view and embedded documentation of a provider/consumer system. VIDs are a visual representation of technical interface specifications that can be accessed, browsed, and sorted using the visual interface browser described herein.

The visual interface browser also includes functionalities supporting the use of VIDs as learning references. Users may add comments, notes, or instructions that are related to the VIDs. Any information added by users to a VID may be added and associated with a respective user, without the added information becoming a part of official documentation, or in other words, a part of the VID itself. The visual interface browser provides an efficient system for viewing VIDs because the visual interface browser also supports multiple and simultaneous viewing of different VIDs for comparison and reference.

Figure 1:
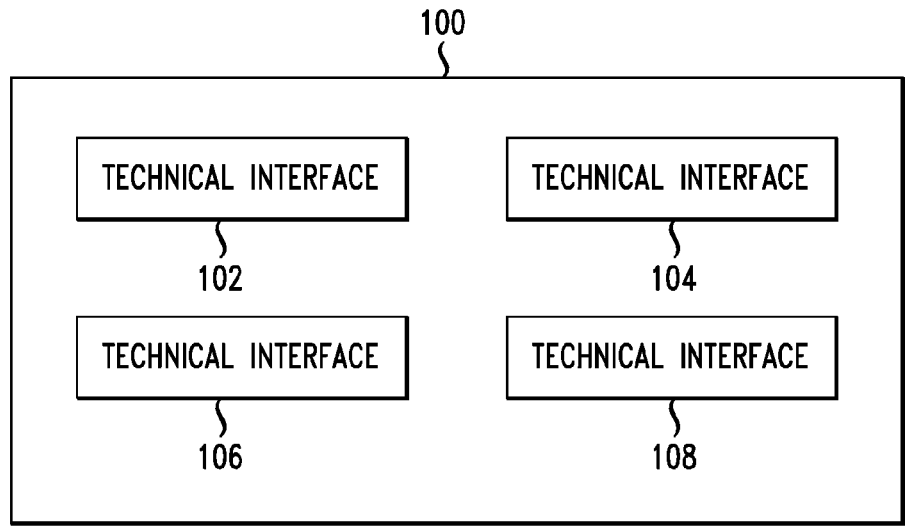
FIG. 1 illustrates an exemplary visual interface browser display in accordance with an embodiment of the present disclosure.

FIG. 1 illustrates an exemplary visual interface browser display 100 in accordance with an embodiment of the present disclosure. Visual interface browser display 100 includes a plurality of technical interface icons. These technical interface icons are represented graphically in FIG. 1 as technical interface icons 102, 104, 106, and 108. Each technical interface icon represents a link to a VID. Selection of a technical interface icon causes display of an associated VID.

Figure 2:
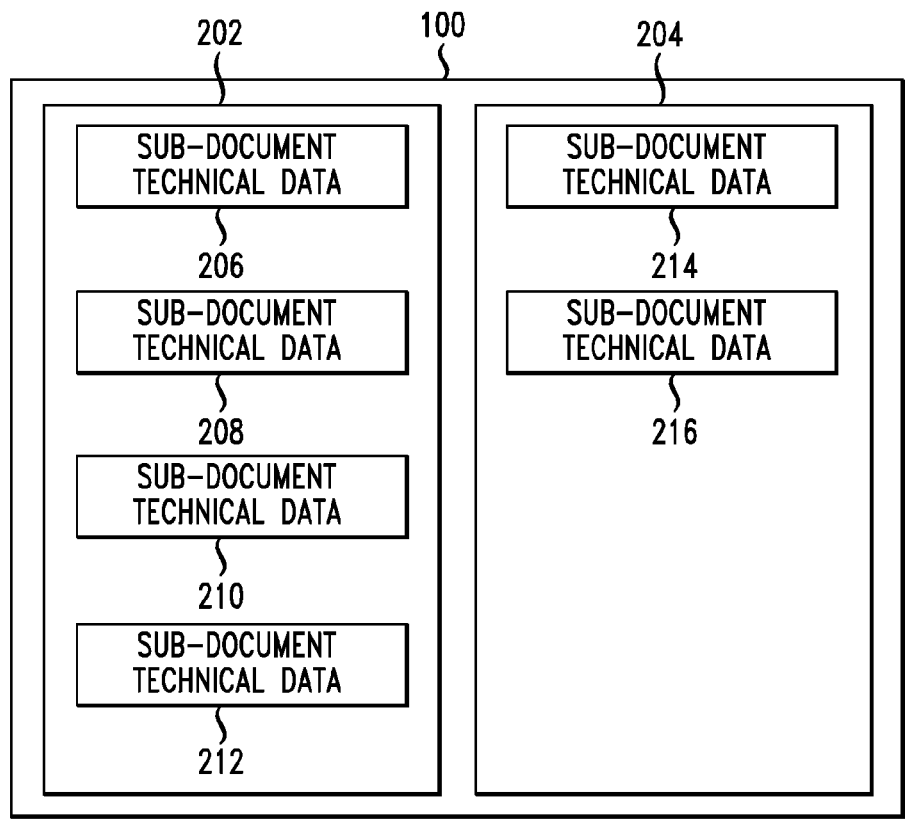
FIG. 2 illustrates exemplary visual interface browser display after selection of a technical interface icon, in accordance with an embodiment of the present disclosure.

FIG. 2 illustrates exemplary visual interface browser 100 after selection of a technical interface icon, in accordance with an embodiment of the present disclosure. For example, if technical interface icon 102 is selected by a user, then associated VID 202 is presented for display on visual interface browser display 100. VID 202 is retrieved from a repository to be displayed on visual interface browser display 100. As multiple VIDs may be presented within visual interface browser display 100, FIG. 2 also shows VID 204, associated with technical interface icon 104, presented in response to a user selection of technical interface icon 104. VID 204 is also retrieved from the repository. Within each VID, associated sub-document technical data is also displayed. The sub-document technical data is also retrieved from the repository and populated within a corresponding VID. In FIG. 2, VID 202 includes sub-document technical data 206, 208, 210, and 212, and VID 204 includes sub-document technical data 214, and 216. It is understood that visual interface browser display 100 may also support the display of more than two VIDs.

Figure 3:
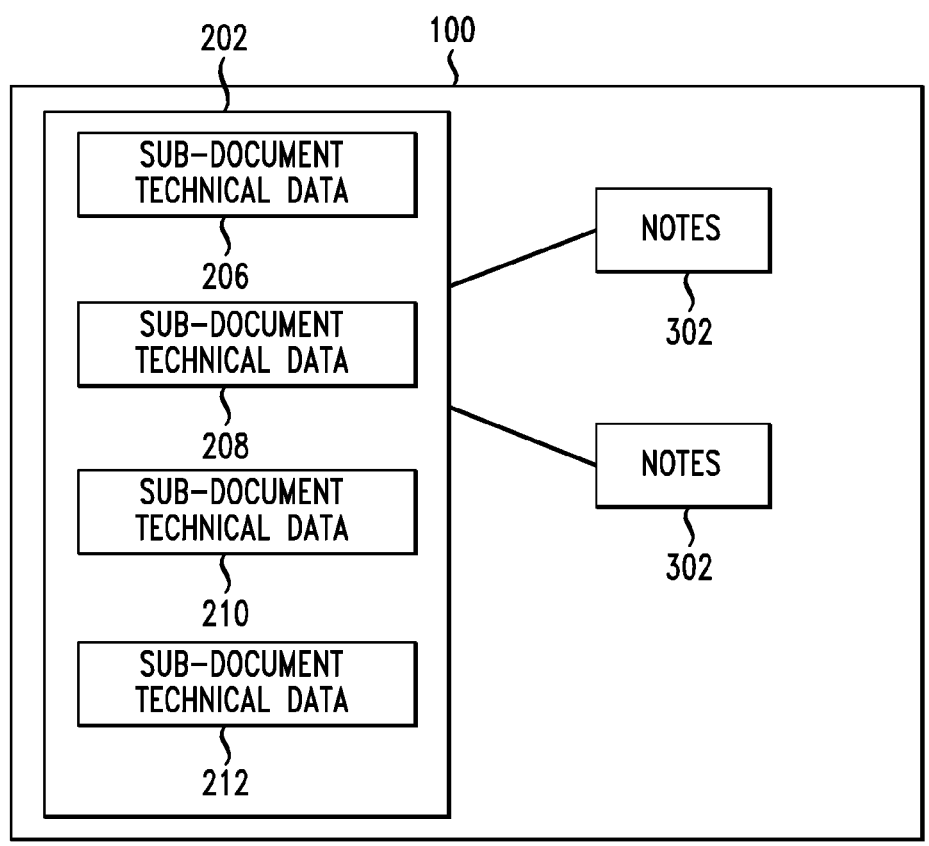
FIG. 3 illustrates exemplary visual interface browser display after retrieval and display of a VID, and including notes associated with the VID, in accordance with an embodiment of the present disclosure.

FIG. 3 illustrates exemplary visual interface browser display 100 after retrieval and display of a VID, and including notes associated with the VID, in accordance with an embodiment of the present disclosure. For the sake of clarity, FIG. 3 includes one selected VID 202 with associated sub-document technical data 206 for display. Also illustrated by FIG. 3 are a plurality of notes 302 associated with VID 202. These notes are added by a specific user, logged into a central server that facilitates access to the visual interface browser shown by visual interface browser display 100. The notes are stored in the repository externally to the VID and associated sub-document technical data. Thus, the notes do not become a part of the official documentation or VID. Additionally, since the notes are not officially a part of the VID, there can be different sets of notes associated with different users. Thus, for example, a first user accessing VID 202 for display will see a different plurality of notes 302 than a second user accessing VID 202.

As each unique user adds notes to a specific VID and its sub-sections, a new section to the users VID Notes document will be created. The Visual Interface Browser has the user id and will use it as a key for the Notes Document. The notes document will contain similar document elements (sub-sections) as defined in the original VID, however the content of each sub-section will only consist of the unique user notes. As a VID is selected for review, the Visual Interface Browser will also retrieve the associated notes document for that user. Both documents will be loaded into memory and parsed accordingly. The contents of VID-Notes will be merged with the VID contents for on-screen display. As notes are added, they will be added to appropriate user document and document section.

The example below depicts the notes created for user BL3825 for VID ABC and VID XYZ):

Brief Example of VID ABC Data Content Showing a Sub-Section (Element):

```
<VID ABC>
    <Contact Info>Brian Lee (BL3825)</Contact Info>
    other data
</VID ABC>
```

Brief Example of VID XYZ Data Content Showing a Sub-Section (Element):

```
<VID XYZ>
    <Hours Avail>9:00am CST to 6:00pm CST</Hours Avail>
    other data
</VID XYZ>
```

VID Notes File for User BL3825 for VID ABC and VID XYZ:

```
<BL3825>
    <VID-Notes>
        <VID>VID ABC>
            <Contact Info>do not use primary contact. Page 555-5555</Contact Info>
        </VID ABC>
        <VID>VID XYZ>
            <Hours Avail>Always call Jeremy to arrange downtime schedule</Hours Avail>
        </VID XYZ>
    </VID-Notes>
</BL3825>
```

Figure 4:
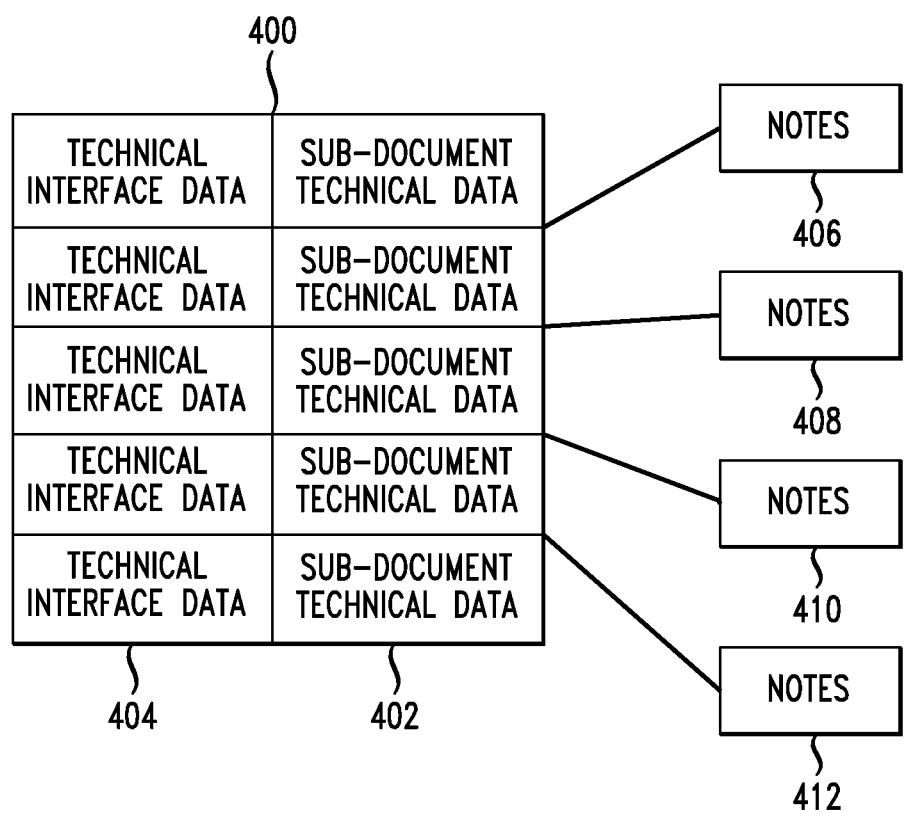
FIG. 4 illustrates an exemplary data structure showing data associated with a VID, in accordance with an embodiment of the present disclosure.

FIG. 4 illustrates an exemplary data structure showing data associated with a VID, in accordance with an embodiment of the present disclosure. As discussed, a VID is a visual representation of a technical interface specification. For example, VID 400 includes data representing the technical interface specification, represented by blocks 404, and associated sub-document technical data, represented by blocks 402, and shown within VID 400 to illustrate that sub-document technical data 402 is a part of the original documentation or VID. Additionally, notes, stored externally to the VID, may be associated with the VID. Notes are stored externally because any number of notes may be associated with different users. As different users view VID 400, they will be presented with notes associated with a particular user, and not any other notes. For example, notes 406, 408, 410, and 412 are all associated with VID 400, but are each associated with a different user.

Figure 5:
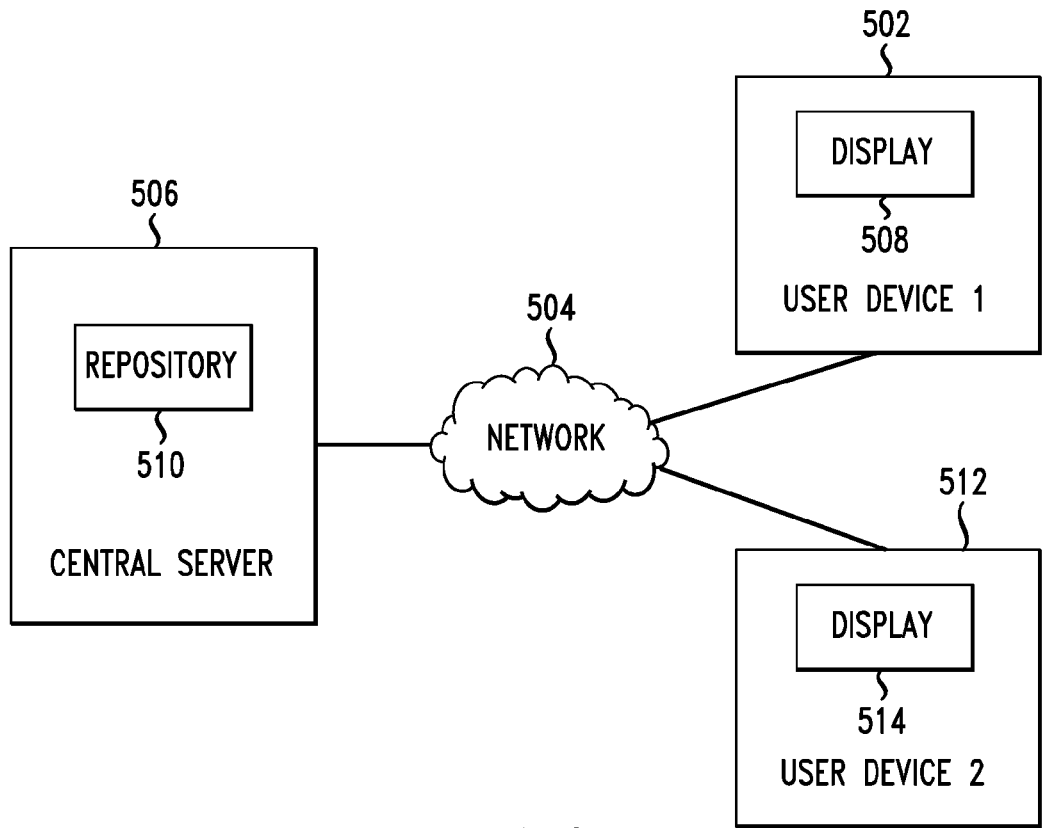
FIG. 5 illustrates an exemplary system including user devices that communicate with a central server in order to access visual interface browser, in accordance with an embodiment of the present disclosure.

FIG. 5 illustrates an exemplary system including user devices that communicate with a central server in order to access visual interface browser 100, in accordance with an embodiment of the present disclosure. For example, user device 502 communicates, over network 504, with central server 506, which facilitates display of visual interface browser 100 on display 508 of user device 502. A user device may be, but is not limited to, any type of computing device with a display capable of displaying visual interface browser 100. Visual interface browser 100 is displayed on display 508 with a plurality of technical interfaces, that when selected by user device 502, causes associated VIDs to be retrieved from repository 510, in order to be displayed via visual interface browser 100. Each VID is comprised of two distinct parts; the visual interactive GUI and the data content describing the specification. The data content format is a well-formed extensible markup language file (XML). The XML file can be stored in a standard XML database within an XML type table or stored as a flat file within a folder structure. The visual interactive GUI in present form is a Java class which is stored in a code repository and deployed with the Visual Interface Browser application. These Java classes are instantiated as needed by the application. The VID's and VID-Notes are the VID's and VID Notes Sub-document technical data, as well as notes associated with a user of user device 502 may also be retrieved from repository 510 for display on visual interface browser 100. Similarly, user device 512 may also communicate over network 504, with central server 506, to have visual interface browser 100 displayed on display 514 of user device 512. A different set of notes associated with a user of user device 512 and associated with the same VID, may be retrieved from repository 510 for display.

Retrieval of notes from associated with a user requires a user entering log-in credentials, which are received by the central server, authenticating the user based on the log-in credentials, and retrieving notes associated with the user. For example, a user enters log-in credentials at user device 502, which are transmitted and received by central server 506. Central server 506 authenticates the user based on the received log-in credentials. After authentications, specific notes associated with a VID selected by the user may be retrieved from repository 510.

Figure 6:
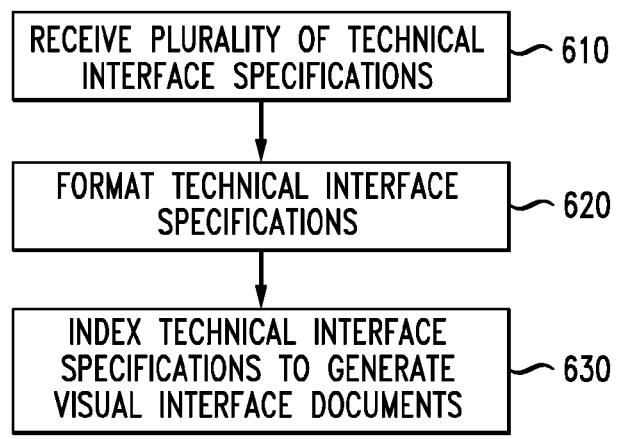
FIG. 6 illustrates an exemplary method for a central server to generate VIDs, in accordance with an embodiment of the present disclosure.

FIG. 6 illustrates an exemplary method 600 for a central server to generate VIDs, in accordance with an embodiment of the present disclosure. At step 610, a central server receives a plurality of technical interface specifications. For example, central server 506 receives a plurality of technical interface specifications.

At step 620, each of the plurality of technical interface specifications is formatted to be linked to an associated technical interface icon. For example, central server 506 formats each of the received plurality of technical interface specifications to link them with an associated technical interface icon.

At step 630, each of the formatted plurality of technical interface specifications is indexed to generate a plurality of visual interface documents (VIDs). Central server 506 indexes the formatted plurality of technical interface specifications to generate a plurality of VIDs for storage on repository 510. Indexing each of the formatted technical interface specifications includes generating a categorized visualization of each technical interface specification for viewing as a VID, as well as identifying sub-document technical data to be linked to the VIDs. Each VID is comprised of two distinct parts; the visual interactive GUI and the data content describing the specification. The data content format is a well-formed extensible markup language file (XML), which is programmatically parsed and loaded in memory as a Document Object Model (DOM). The XML file and therefore the DOM, contain elements, which act as indexes to the relevant content therein and can be queried, retrieved and updated accordingly. As the user interacts with various aspects of the visual GUI using mouse-clicks or touch, these actions trigger a query event to the DOM to retrieve and display the relevant sub-document data content. Since the query event is context sensitive, the sub-document element name is defined as part of the query, used as the index to retrieve content from the DOM, and displayed to the user.

Figure 7:
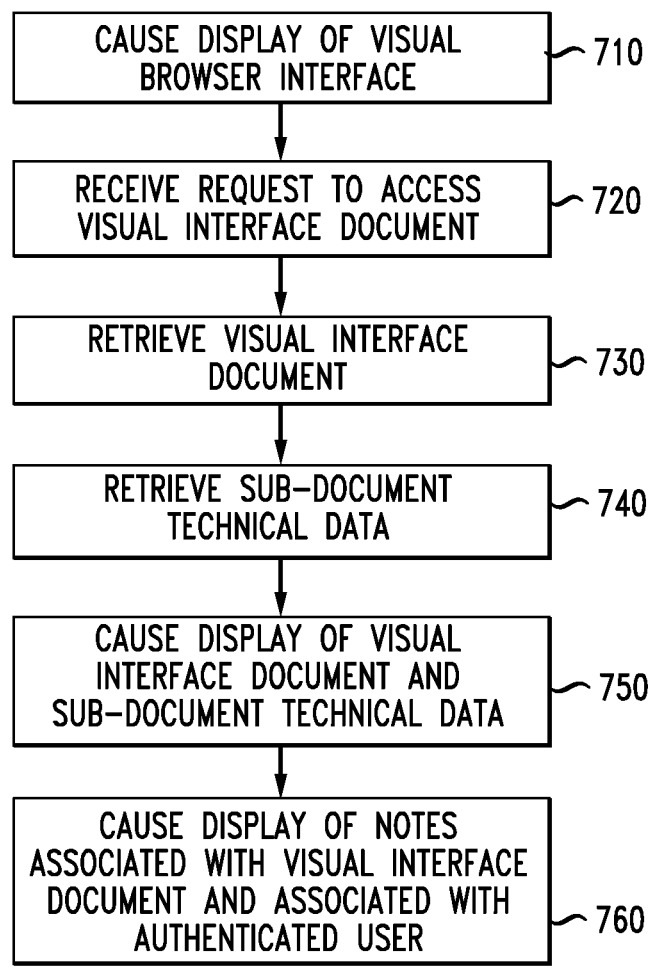
FIG. 7 illustrate an exemplary method for a central server to cause display of VIDs on a visual interface browser, in accordance with an embodiment of the present disclosure.

FIG. 7 illustrate an exemplary method 700 for a central server to cause display of VIDs on a visual interface browser, in accordance with an embodiment of the present disclosure. At step 710, a visual interface browser is caused to be displayed on a user device. For example, central server 506 communicates with user device 502 through a network and causes the display of a visual interface browser on user device 502 through a transmission of data.

At step 720, a request to access a VID is received from a user of a user device. For example, user device 502 transmits a request to central server 506 to view a VID. A request for the VID is transmitted from user device 502 based on a selection of a technical interface icon, shown on visual interface browser display 100, associated with the VID. Visual interface browser display 100 may be displayed on a display of user device 502.

At step 730, in response to a request from a user device, a VID is retrieved from the repository 510.

At step 740, the sub-document technical data that is associated with the VID is retrieved from repository 510. The sub-technical data represents technical data that is stored within repository 510 and that has been associated with a VID during indexing. Once a VID and sub-document technical data has been retrieved from repository 510, central server 506 may facilitate the display of the VID and sub-document technical data at user device 502.

At step 750, the central server transmits the VID and associated sub-document technical data to user device, causing the VID to be displayed. For example, central server 506 transmits the retrieved VID and associated sub-document technical data to user device 502, wherein the VID and associated sub-document technical data is caused to be displayed on display 508 of user device 502.

At step 760, any notes associated with the VID, and associated specifically with a user of the user device, may be retrieved and transmitted to the user device for display. For example, central server 506 searches repository 510 for any notes associated with the VID and a particular user at user device 502. Central server 506 searches repository 510 for notes that are linked to the VID. Then central server 506 searches the notes linked to the VID for specific ones that are associated with a user logged in at user device 506. These notes are then transmitted to user device 502 and are caused to be displayed on display 508 of user device 502 as annotations accompanying the VID and associated sub-document technical data.

Figure 8:
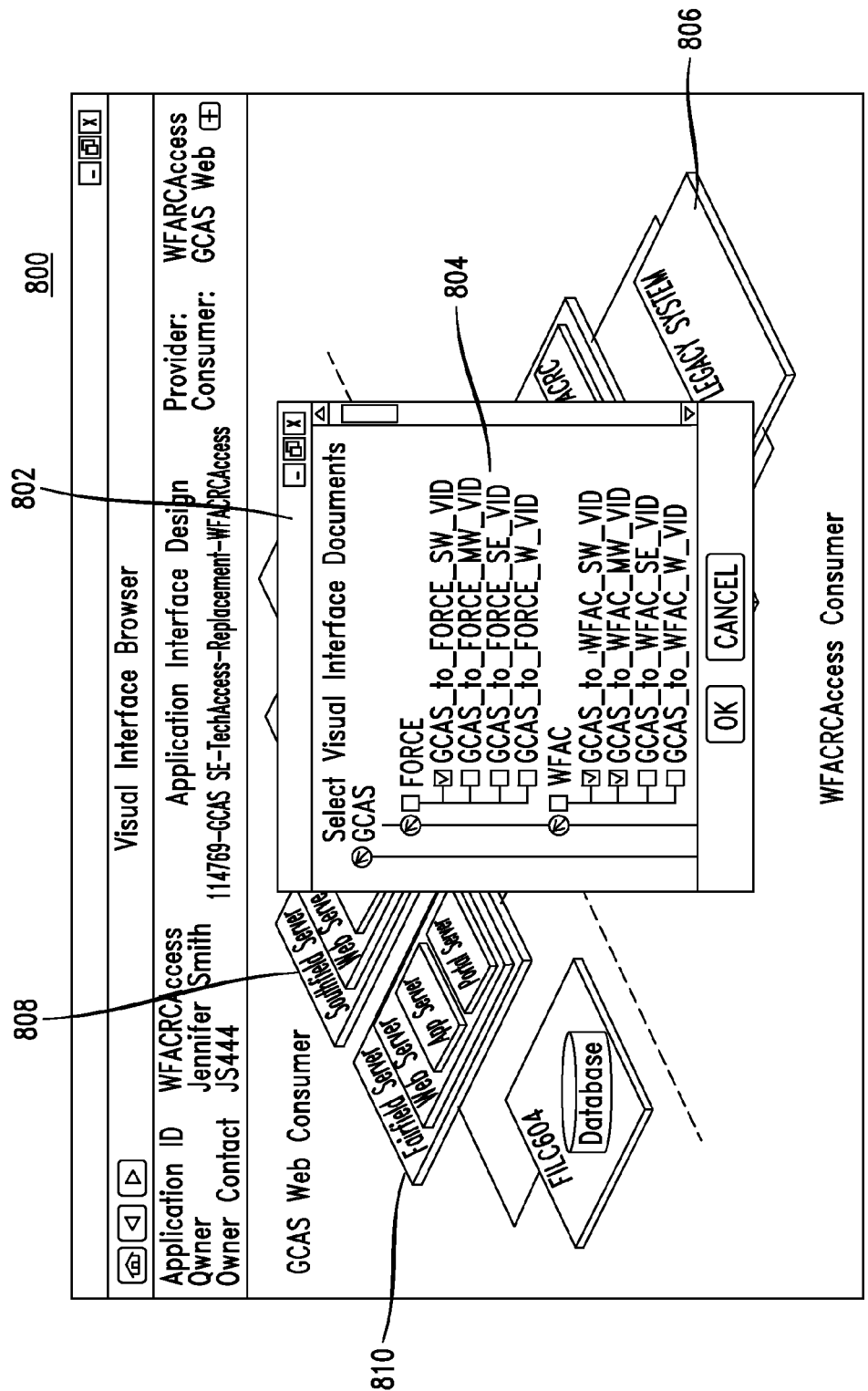
FIG. 8 illustrates an exemplary view of a visual interface browser display in accordance with an embodiment of the present disclosure.

FIG. 8 illustrates an exemplary view of a visual interface browser display 800 in accordance with an embodiment of the present disclosure. Visual interface browser display 800 includes a display of a VID 802, and associated sub-document technical data 804. Additionally, technical interfaces 806, 808, and 810 are displayed in the background.

Figure 9:
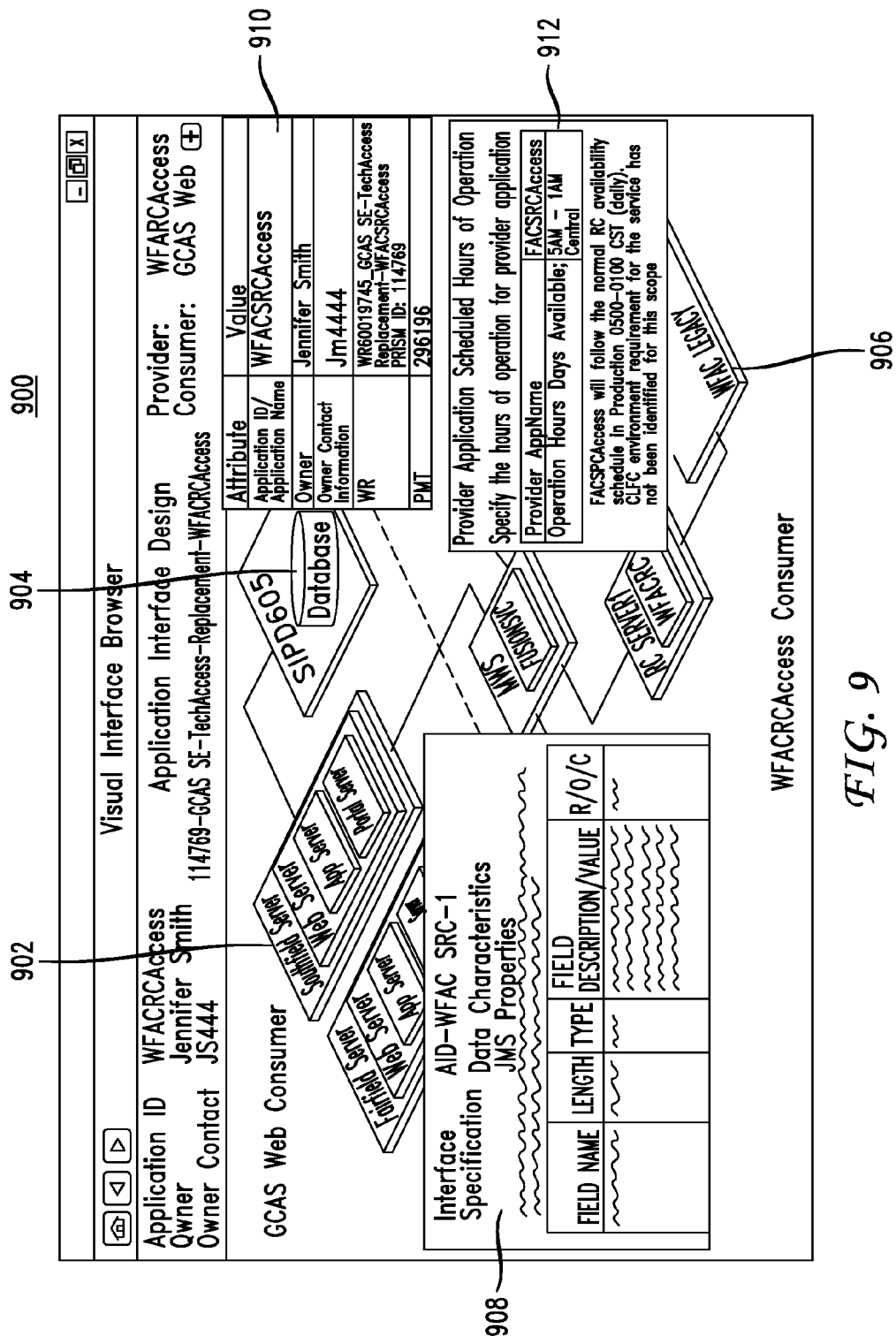
FIG. 9 illustrates an exemplary view of a visual interface browser display 900 in accordance with an embodiment of the present disclosure.

FIG. 9 illustrates an exemplary view of a visual interface browser display 900 in accordance with an embodiment of the present disclosure. Visual interface browser display 900 includes technical interfaces 902, 904, and 906 shown throughout, as well as certain associated VIDs 908, 910, and 912.

Figure 10:
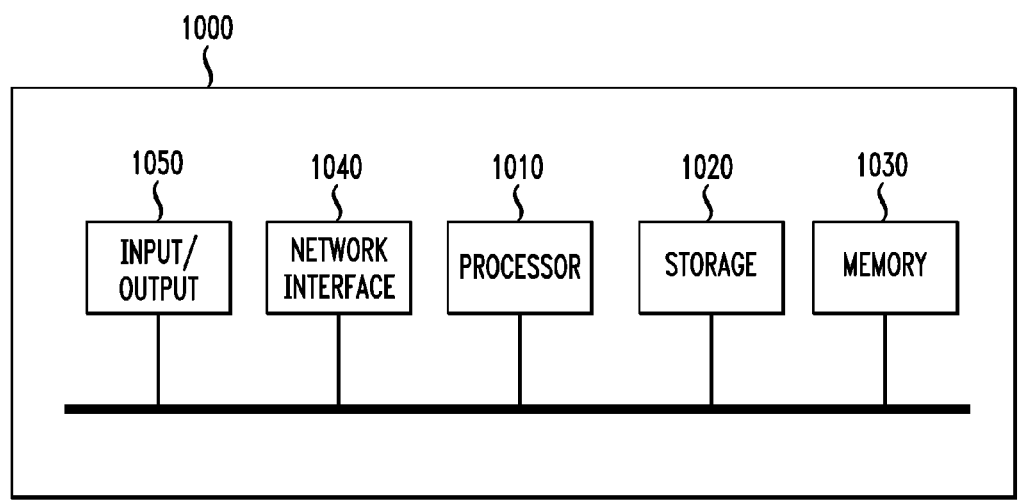
FIG. 10 illustrates a high-level block diagram of a computer used to implement the methods described herein, in accordance with an embodiment of the present disclosure.

The above-described methods for viewing VIDs using a visual interface browser can be implemented on a computer using well-known computer processors, memory units, storage devices, computer software, and other components. A high-level block diagram of such a computer is illustrated in FIG. 10. Computer 1000 contains a processor 1010, which controls the overall operation of the computer 1000 by executing computer program instructions, which define such operations. The computer program instructions may be stored in a storage device 1020, or other computer readable medium (e.g., magnetic disk, CD ROM, etc.), and loaded into memory 1030 when execution of the computer program instructions is desired. Thus, the method steps of FIGS. 6 and 7 can be defined by the computer program instructions stored in the memory 1030 and/or storage 1020 and controlled by the processor 1010 executing the computer program instructions. For example, the computer program instructions can be implemented as computer executable code programmed by one skilled in the art to perform an algorithm defined by the method steps of FIGS. 6 and 7. Accordingly, by executing the computer program instructions, the processor 1010 executes an algorithm defined by the method steps of FIGS. 6 and 7. While the computer 1000 has been described as being used for converting data messages by performing an algorithm in accordance with the method steps shown in FIGS. 6 and 7, computer 1000 may also perform other functionalities, such as those described above in connection with the other Figures. The computer 1000 also includes one or more network interfaces 1040 for communicating with other devices via a network. The computer 1000 also includes input/output devices 1050 that enable user interaction with the computer 1000 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the disclosure is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the present disclosure.

I claim:

1. A method, comprising:
    generating visual interface documents for a plurality of formatted technical interface specifications, by indexing the content of each of the formatted technical interface specifications, each of the visual interface documents comprising a visual interactive graphical user interface and data content describing one of the corresponding formatted technical interface specifications, the visual interactive graphical user interface comprising at least a java class that is used by a visual interface browser application, and wherein the generating visual interface documents further comprises searching a database and linking associated sub-document technical data to each of the visual interface documents;
    receiving a request for one of the visual interface documents based on user interaction with a graphical user interface;
    transmitting, in response to the request, a context sensitive query to a repository identifying the visual interface document;
    receiving a requested visual interface document from the repository;
    transmitting, in response to the request, a context sensitive query to the repository identifying a sub-document element name associated with sub-document technical data linked to the requested visual interface document;
    receiving the sub-document technical data from the repository;
    transmitting, in response to the request, a context sensitive query to the repository identifying notes associated with the requested visual interface document and an identity of the user;
    receiving the notes from the repository, the notes received from the repository associated with the requested visual interface document and the identity of the user;
    causing display, on a user device, of a visual interface browser display comprising a first icon representing the requested visual interface document and a second icon representing sub-document technical data received from the repository, the second icon displayed within the first icon; and
    causing display, on the user device, of the notes received from the repository.

2. A system, comprising:
    a processor; and
    a memory to store computer program instructions, the computer program instructions, when executed on the processor, cause the processor to perform operations comprising:
    generating visual interface documents for a plurality of formatted technical interface specifications, by indexing the content of each of the formatted technical interface specifications, each of the visual interface documents comprising a visual interactive graphical user interface and data content describing one of the corresponding formatted technical interface specifications, the visual interactive graphical user interface comprising at least a java class that is used by a visual interface browser application, and wherein the generating visual interface documents further comprises searching a database and linking associated sub-document technical data to each of the visual interface documents;
    receiving a request for one of the visual interface document based on user interaction with a graphical user interface;
    transmitting, in response to the request, a context sensitive query to a repository identifying the visual interface document;
    receiving a requested visual interface document from the repository;
    transmitting, in response to the request, a context sensitive query to the repository identifying a sub-document element name associated with sub-document technical data linked to the requested visual interface document;
    receiving the sub-document technical data from the repository;
    transmitting, in response to the request, a context sensitive query to the repository identifying notes associated with the requested visual interface document and an identity of the user;
    receiving the notes from the repository, the notes received from the repository associated with the requested visual interface document and the identity of the user;
    causing display, on a user device, of a visual interface browser display comprising a first icon representing the requested visual interface document and a second icon representing sub-document technical data received from the repository, the second icon displayed within the first icon; and
    causing display, on the user device, of the notes received from the repository.

3. A non-transitory computer readable medium storing computer program instructions for operating a visual interface browser, which, when executed on a processor, cause the processor to perform operations comprising:

generating visual interface documents for a plurality of formatted technical interface specifications, by indexing the content of each of the formatted technical interface specifications, each of the visual interface documents comprising a visual interactive graphical user interface and data content describing one of the corresponding formatted technical interface specifications, the visual interactive graphical user interface comprising at least a java class that is used by a visual interface browser application, and wherein the generating visual interface documents further comprises searching a database and linking associated sub-document technical data to each of the visual interface documents;

receiving a request for one of the visual interface documents based on user interaction with a graphical user interface;

transmitting, in response to the request, a context sensitive query to a repository identifying the visual interface document;

receiving a requested visual interface document from the repository;

transmitting, in response to the request, a context sensitive query to the repository identifying a sub-document element name associated with sub-document technical data linked to the requested visual interface document;

receiving the sub-document technical data from the repository;

transmitting, in response to the request, a context sensitive query to the repository identifying notes associated with the requested visual interface document and an identity of the user;

receiving the notes from the repository, the notes received from the repository associated with the visual interface document and the identity of the user;

causing display, on a user device, of a visual interface browser display comprising a first icon representing the requested visual interface document and a second icon representing sub-document technical data received from the repository, the second icon displayed within the first icon; and causing display, on the user device, of the notes received from the repository.

* * * * *